United States Patent

[11] 3,596,935

| [72] | Inventor | George McGeoch, Sr.<br>502 Manor Road, Cinnaminson, N.J. 08077 |
|---|---|---|
| [21] | Appl. No. | 815,243 |
| [22] | Filed | Mar. 12, 1969 |
| [45] | Patented | Aug. 3, 1971 |

[54] JACKETED PIPE FITTING
12 Claims, 11 Drawing Figs.

[52] U.S. Cl.......................................................... 285/133,
165/47, 285/41, 285/150, 285/177, 285/179, 285/286
[51] Int. Cl.............................................................. F16l 39/00
[50] Field of Search.............................................. 285/131,
132, 133, 150, 155, 156, 41, 179, 286, 177, 133;
137/340; 138/114; 165/47, 143

[56] References Cited
UNITED STATES PATENTS

| 2,498,924 | 2/1950 | Keller........................ | 285/138 X |
| 2,654,619 | 10/1953 | Gaum......................... | 285/177 |
| 2,695,182 | 11/1954 | Folz............................. | 285/41 X |
| 3,186,431 | 6/1965 | Moore......................... | 285/133 X |
| 3,199,898 | 8/1965 | Fallou......................... | 137/340 X |

FOREIGN PATENTS

| 6,402,773 | 9/1964 | Netherlands................ | 285/150 |

Primary Examiner—Dave W. Arola
Attorney—Louis V. Schiavo

ABSTRACT: An assembly of plate members welded together and to the main body part of a pipe fitting provide a fluidtight jacket completely encompassing said main body part of the fitting.

PATENTED AUG 3 1971

MEDIAN PLANE

MEDIAN PLANE

INVENTOR.
GEORGE McGEOCH, SR.
BY Louis V Schiavo
ATTORNEY.

FIG. IA

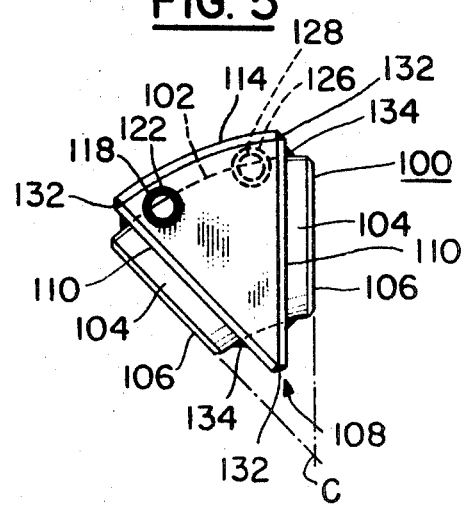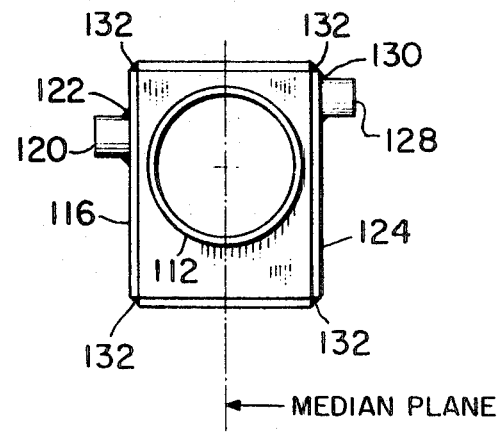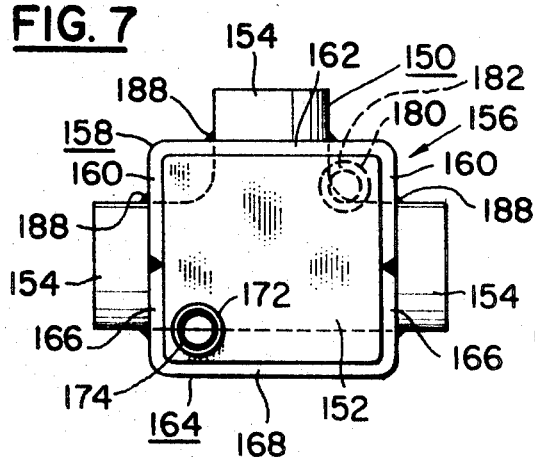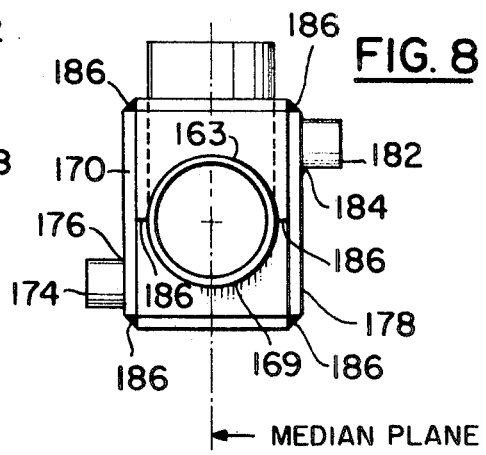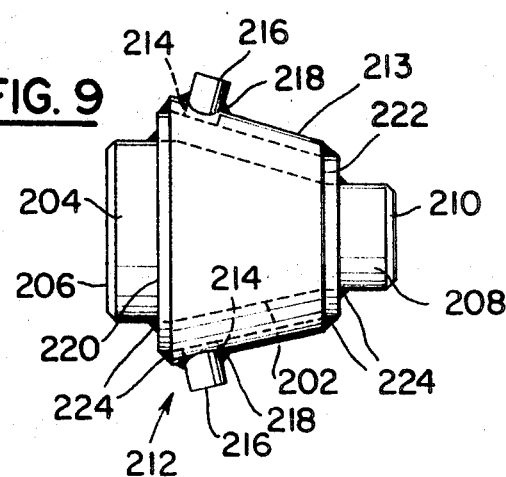

JACKETED PIPE FITTING

BACKGROUND OF THE INVENTION

1. Field of the Invention

The present invention relates to fittings for connection in pipe lines handling viscous materials.

2. Description of the Prior Art

Jacketed fittings for use in pipe lines handling viscous materials are known. However, prior art forms of such fittings have not proved to be entirely satisfactory because (1) either the jacket is in the form of a blister on the body of the fitting and therefore is only a partial jacket, or (2) the jacket is cast integral with the fitting and therefore, while completely encompassing the main body of the fitting, is inordinately costly to manufacture.

SUMMARY OF THE INVENTION

The present invention is directed to the combination of a cast pipe fitting and an assembly of plate members welded together and to the fitting to provide therefor a comparatively inexpensive fluidtight jacket completely encompassing the main body of the fitting.

DESCRIPTION OF THE DRAWINGS

FIG. 1A is a side view of a 45° tangential elbow provided with a jacket constructed in accordance with the present invention;

FIG. 5 is a side view of a 45° weld ell provided with a jacket constructed in accordance with the present invention;

FIG. 6 is an end view of the ell shown in FIG. 5;

FIG. 7 is a side view of a tangential tee provided with a jacket constructed in accordance with the present invention;

FIG. 8 is an end view of the tee shown in FIG. 7; and

FIG. 9 is a side view of a concentric weld reducer provided with a jacket constructed in accordance with the present invention.

Figure 1:
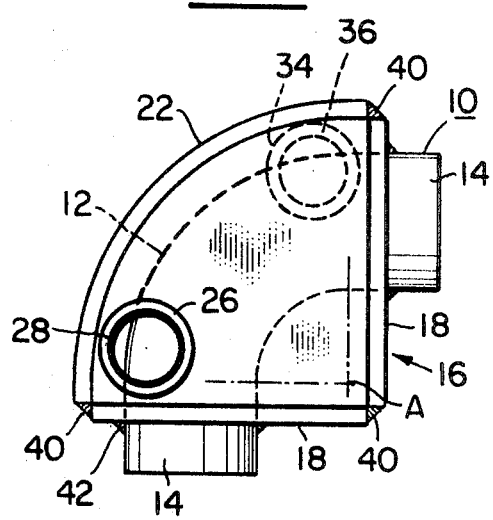
FIG. 1 is a side view of a 90° tangential elbow provided with a jacket constructed in accordance with the present invention.

The following description is directed to the specific embodiments of the invention shown in the drawings and is not intended to be addressed to the scope of the invention which may be practiced in various other forms.

Figure 2:
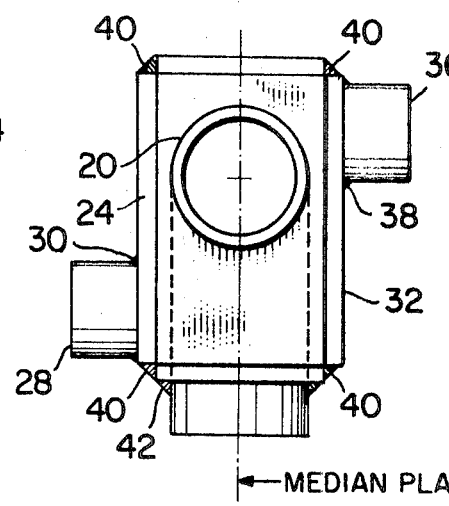
FIG. 2 is an end view of the elbow shown in FIG. 1.

Referring particularly to FIGS. 1 and 2, the pipe fitting, generally designated 10, is in the form of a tubular member circular in transverse section. The member is provided with a main body part 12 which is arcuate in shape having its center of curvature at A. Extending from each end of the main body part 12 is a terminal portion 14 which is tangential to the arcuate main body part 12. The fitting is provided with a jacket, generally designated 16.

The jacket includes a pair of rectangular plates 18 each of which is provided with an opening 20 through which there extends one of the terminal portions 14 of the tubular member. Each plate 18 is planar and normal to the associated terminal portion 14 and to the other plate 18. The jacket also includes a plate 22 arcuate in shape and overlying the back of the arcuate main body part 12. The plates 18 and 22 define openings respectively on opposite sides of the tubular member. One of these openings is closed by a suitably shaped plate 24 provided with an opening 26 which accommodates a screw (internally threaded) half coupling 28 affixed to the plate by a continuous weld 30. The other opening is closed by a suitably shaped plate 32 provided with an opening 34 which accommodates a screw half coupling 36 affixed to the plate by a continuous weld 38. Each plate 24 and 32 is affixed to the plates 18 and 22 by means of a continuous weld 40 extending thereabout, and the plates 18 and 22 are affixed to each other by means of continuous welds 40 which extend across the median plane of the tubular member. Each of the plates 18 is affixed to the associated terminal portion 14 of the tubular member by means of a continuous weld 42 extending all around the opening 20.

Figure 2A:
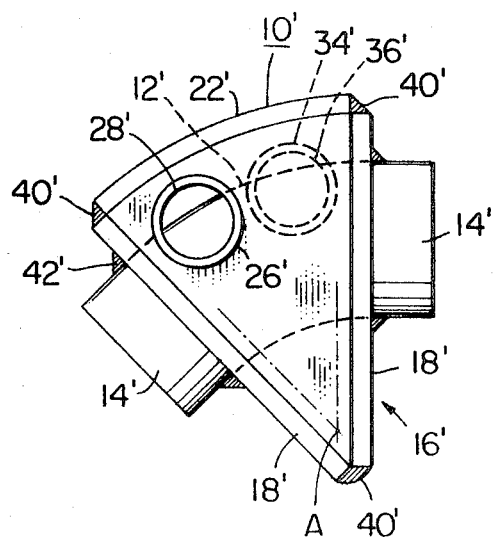
FIG. 2A is an end view of the elbow shown in FIG. 1A.
Figure 2A:
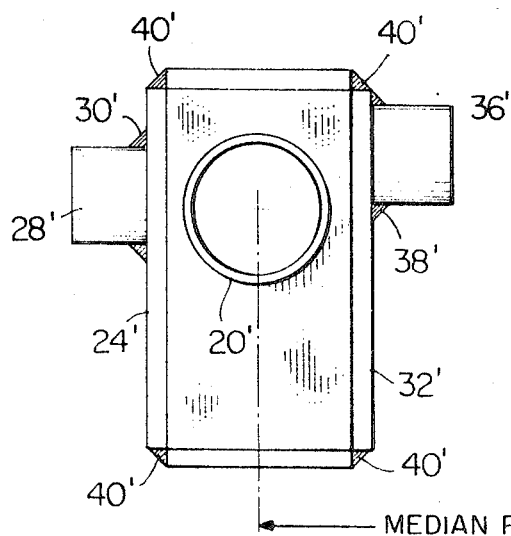

In view of the description of the pipe fitting 10 shown in FIGS. 1 and 2, a 90° tangential elbow, it is deemed unnecessary to describe in detail the pipe fitting shown in FIGS. 1A and 2A, a 45° tangential elbow. The parts of the fitting shown in FIGS. 1A and 2A correspond to those of the fitting shown in FIGS. 1 and 2 and are identified by the same numerals primed.

Figure 3:
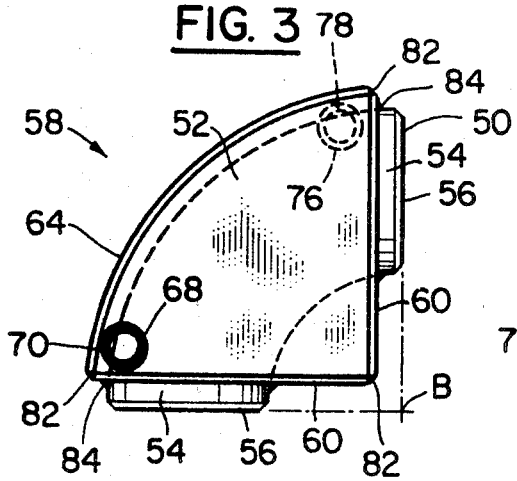
FIG. 3 is a side view of a 90° weld ell provided with a jacket constructed in accordance with the present invention.
Figure 4:
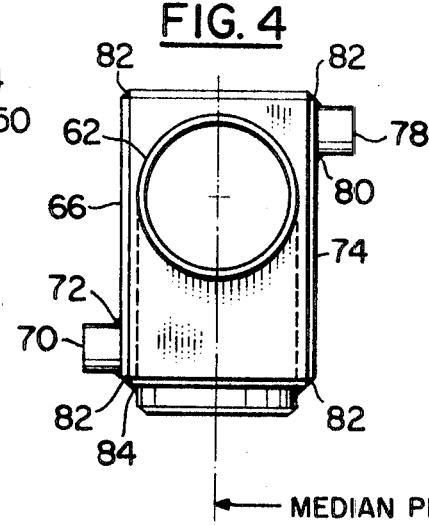
FIG. 4 is a side view of the ell shown in FIG. 3.

Now referring particularly to FIGS. 3 and 4, the pipe fitting, generally designated 50, is a tubular member circular in transverse section. The main body part, designated 52, terminates in portions 54, beveled, as at 56. The tubular member is arcuate from one extremity thereof to the other, the center of curvature being at B. The fitting is provided with a jacket, generally designated 58.

The jacket includes a pair of rectangular plates 60 each of which is provided with an opening 62 through which there extends one of the terminal portions 54 of the tubular member. Each plate 60 is normal to the central axis of the opening at the associated end of the tubular member and to the other plate 60. Overlying the back of the arcuate main body part 52 is an arcuate plate 64. The plates 60 and 64 define a pair of openings respectively on opposite sides of the tubular member. A suitably shaped plate 66 closes the opening on one side of the tubular member and is provided with an opening 68 which accommodates a screw half coupling 70 affixed to the plate by means of a continuous weld 72. The opening on the other side of the tubular member is closed by a suitably shaped plate 74 provided with an opening 76 which accommodates a screw half coupling 78 affixed to the plate by means of a weld 80. Each plate 66 and 74 is affixed to the plates 60 and 64 by means of a continuous weld 82 extending thereabout, and the plates 60 and 64 are affixed to each other by means of continuous welds 82 which extend across the median plane of the tubular member. Each of the plates 60 is affixed to the associated terminal portion 54 of the tubular member by means of a continuous weld 84 extending all around the opening 62.

Now referring particularly to FIGS. 5 and 6, the pipe fitting, generally designated 100, is in the form of a tubular member circular in transverse section. The main body part, designated 102, terminates in portions 104, beveled as at 106. The tubular member is arcuate from one extremity thereof to the other, the center of curvature being at C. The fitting is provided with a jacket, generally designated 108.

The jacket includes a pair of rectangular plates 110 each of which is provided with an opening 112 through which there extends one of the terminal portions 104 of the tubular member. Each plate 110 is normal to the central axis of the opening at the associated end of the tubular member and disposed at an acute angle to the other plate 110. Overlying the back of the arcuate main body part 102 is an arcuate plate 114. The plates 110 and 114 define a pair of openings respectively on opposite sides of the tubular member. A suitably shaped plate 116 closes the opening on one side of the tubular member and is provided with an opening 118 which accommodates a screw half coupling 120 affixed to the plate by means of a continuous weld 122. The opening on the other side of the tubular member is closed by a suitably shaped plate 124 provided with an opening 126 which accommodates a screw half coupling 128 affixed thereto by a continuous weld 130. Each of the plates 116 and 124 is affixed to the plates 110 and 114 by means of a continuous weld 132 extending all around the edge of the plate, and the plates 110 and 114 are affixed to each other by means of continuous welds 132 which extend across the median plane of the tubular member. Each of the plates 110 is affixed to the associated terminal portion 104 by a continuous weld 134 extending all around the opening 112.

Now referring particularly to FIGS. 7 and 8, the pipe fitting 150 is provided with a main body part 152 including a head portion and a stem portion each circular in transverse section. Each extremity of the pipe fitting terminates in a portion 154. The pipe fitting is provided with a jacket, generally designated 156.

The jacket comprises a plate 158 U-shaped in transverse section having a pair of laterally spaced legs 160 interconnected by a part 162 which is provided with an opening through which extends the stem portion of the main body part 152. The plate 158 is disposed in overlying relation to one side of the head portion of the main body part 152. The legs 160 of the plate 158 are provided with semicircular recesses 163 which make it possible to fit the legs 160 over the main body part 152. Overlying the opposite side of the main body part 152 is a plate 164 U-shaped in transverse section and provided with a pair of laterally spaced legs 166 interconnected by a portion 168. The legs 166 of the plate 164 are provided with semicircular recesses 169 which make it possible to fit the legs 166 over the main body part 152. The plates 158 and 164 conjointly define rectangular openings respectively on opposite sides of the fitting. A suitably shaped plate 170 closes one of said openings and is provided with an opening 172 which accommodates a screw half coupling 174 affixed to the plate by a continuous weld 176. The other opening is closed by a suitably shaped plate 178 having an opening 180 therein which accommodates a screw half coupling 182 affixed to the plate by a continuous weld 184. Each of the plates 170 and 178 is affixed to the plates 158 and 164 by means of a continuous weld 186 extending all around the edge of the plate. At each end of the fitting the opposed recesses 163 and 169 respectively of the legs 160 and 166 conjointly form a circular opening through which the associated terminal portion 154 extends. The legs 160 and 166 are affixed to the associated terminal portion 154 by continuous welds 188, and the portion 162 of the plate 158 is affixed to the associated terminal stem portion 154 by means of a continuous weld 188.

Now referring particularly to FIG. 9, the pipe fitting is provided with a tapered main body part 202 having at one end thereof a terminal portion 204, beveled as at 206, and at the other end thereof a terminal portion 208 of reduced diameter, beveled as at 210. The fitting is provided with a jacket, generally designated 212.

The jacket includes a member 213 frustoconical in shape and provided with a pair of openings 214 respectively on diametrically opposite sides thereof, each of which accommodates a screw half coupling 216 affixed to the member 213 by a continuous weld 218. The terminal portion 204 extends through an opening in a plate annulus 220 closing one end of the jacket, and the terminal portion 208 extends through a plate annulus 222 closing the opposite end of the jacket. Each of the plates is affixed to the member 213 and to the tubular member by means of continuous welds 224.

With regard to each of the foregoing embodiments of the invention, it may be necessary or desirable for various reasons to maintain material flowing through the fitting at a predetermined temperature. In this event, a fluid medium, such as steam, is introduced into the jacket through one of the screw half couplings. The fluid medium flows about the main body part of the fitting to effect the desired heat exchange through the wall of the main body part of the fitting.

Although this invention has been described with respect to specific embodiments thereof, it will be appreciated by one skilled in the art that the invention is broad enough to encompass all equivalent embodiments thereof without departing from the spirit and scope of the invention as set forth in the foregoing specification and the appended claims.

What I claim is:
1. A pipe fitting comprising
   A. a tubular member having
      1. an arcuate main body part, and
      2. terminal portions extending respectively from opposite ends and in longitudinal continuation of said arcuate main body part for connection in a pipe line,
   B. an assembly of plate members including
      1. a first pair of plates having said terminal portions extending respectively therethrough, said plates being joined together along a line passing through the median plane of said tubular member,
      2. a plate overlying the back of said tubular member and having opposite end portions joined to the associated end portions respectively of said pair of plates along lines passing through said median plane, said plates defining a pair of openings respectively on opposite sides of said tubular member, and
      3. a second pair of plates disposed respectively on opposite sides of said tubular member and closing said openings, and
   C. weldments joining said plate members together and to said main body part to provide a fluidtight jacket with space under said jacket completely encompassing said tubular main body part, said jacket being provided with openings respectively for introduction of a fluid medium into and discharge of the same from said space.

2. A pipe fitting according to claim 1 wherein each plate of the first pair thereof is planar and disposed substantially normal to the median plane of the tubular member, the plate overlying the back of said tubular member is arcuate and disposed substantially normal to said median plane, and each plate of the second pair thereof is planar and disposed substantially parallel to said median plane.

3. A pipe fitting according to claim 2 wherein the planes coincident respectively with the extremities of the tubular member are normal to each other, the first pair of plates are normal to each other, and each plate of said pair thereof is parallel to the associated one of said planes.

4. A pipe fitting according to claim 2 wherein the planes coincident respectively with the extremities of the tubular member are disposed on an angle of 45° relative to each other, the first pair of plates are disposed at an angle of 45° relative to each other, and each plate of said pair thereof is parallel to the associated one of said planes.

5. A pipe fitting according to claim 1 wherein the terminal portions of the tubular member are tangential to the arcuate main body part thereof.

6. A pipe fitting according to claim 5 wherein the tangential opposite end portions of the tubular member are normal to each other, the first pair of plates are normal to each other, and each plate of said pair thereof is normal to the associated tubular end portion.

7. A pipe fitting according to claim 5 wherein the included angle between the central longitudinal axes of the tangential opposite end portions of the tubular member are disposed at an angle of 135° relative to each other, the first pair of plates are disposed at an angle of 45° relative to each other, and each plate of said pair thereof is normal to the associated tubular end portion.

8. A pipe fitting comprising
   A. a tubular member having
      1. a main body part with axially aligned terminal portions extending respectively from opposite ends thereof for connection in a pipe line, and
      2. at least one branch extending laterally from said main body part with a terminal portion for connection in a pipe line,
   B. an assembly of plate members forming a rectangular boxlike jacket structure with six sides, each of the several terminal portions of said tubular member extending respectively through the associated side of said boxlike jacket structure, and
   C. weldments joining said plate members together and to said tubular member to provide a fluidtight jacket with space under said jacket completely encompassing said tubular main body part, said jacket being provided with openings respectively for introduction of a fluid medium into and discharge of the same from said space.

9. A pipe fitting according to claim 8 wherein the branches from the main body part of the tubular member are normal thereto, and the jacket includes a pair of plate members each of Ueshape in transverse section and disposed to conjointly provide four sides of the boxlike jacket structure.

10. A pipe fitting according to claim 8 wherein the main body of the tubular member is provided with a single laterally extending branch, and the jacket includes a pair of plate members each of U-shape in transverse section and disposed respectively on opposite sides of said main body of the tubular member to conjointly provide four sides of the boxlike jacket structure.

11. A pipe fitting comprising
A. a member having
1. a tubular main body part tapered in shape, and
2. tubular terminal portions extending from said main body part and corresponding in shape and size to the shape and size respectively of the large and small ends of said main body part,
B. an assembly including
1. a section tapered in shape embracing said main body part, and
2. a pair of plate members respectively at opposite ends of said tapered section and having said terminal portions extending respectively therethrough for connection in a pipe line, and
C. weldments joining the tapered section embracing said main body part and said pair of plates together and to said main body part to provide a fluidtight jacket with space under said jacket completely encompassing said tubular main body part, said jacket being provided with openings respectively for introduction of a fluid medium into and discharge of the same from said space.

12. A pipe fitting according to claim 11 wherein the main body part of the tubular member is frustoconical in shape, the terminal portions extending from said main body part are cylindrical in shape, corresponding in diameter respectively to the large and small diameters of said main body part, and the jacket includes a section frustoconical in shape embracing said main body part, and a pair of plates respectively at opposite ends of said frustoconical section having said terminal portions of the tubular member extending respectively therethrough for connection in a pipe line.